US008677074B2

(12) United States Patent
Mathieson et al.

(10) Patent No.: US 8,677,074 B2
(45) Date of Patent: Mar. 18, 2014

(54) SHARED MEMORY ACCESS TECHNIQUES

(75) Inventors: John George Mathieson, Los Gatos, CA (US); David Lind Weigand, Cupertino, CA (US); Sudhakaran Ram, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 699 days.

(21) Appl. No.: 12/335,478

(22) Filed: Dec. 15, 2008

(65) Prior Publication Data

US 2010/0153618 A1 Jun. 17, 2010

(51) Int. Cl.
*G06F 12/00* (2006.01)

(52) U.S. Cl.
USPC ........................................................ 711/147

(58) Field of Classification Search
None
See application file for complete search history.

(56) References Cited

U.S. PATENT DOCUMENTS

| | | | |
|---|---|---|---|
| 4,000,487 A | 12/1976 | Patterson et al. | |
| 4,100,601 A | 7/1978 | Kaufman et al. | |
| 4,553,224 A | 11/1985 | Struger et al. | |
| 4,628,446 A | 12/1986 | Hoffner | |
| 5,293,489 A | 3/1994 | Furui et al. | |
| 5,347,637 A | 9/1994 | Halford | |
| 5,508,909 A | 4/1996 | Maxwell et al. | |
| 5,819,058 A | 10/1998 | Miller et al. | |
| 6,233,641 B1 | 5/2001 | Graham et al. | |
| 6,381,664 B1 | 4/2002 | Nishtala et al. | |
| 6,499,077 B1 | 12/2002 | Abramson et al. | |
| 6,553,446 B1 | 4/2003 | Miller | |
| 6,658,559 B1 | 12/2003 | Arora et al. | |
| 6,678,784 B2 | 1/2004 | Marmash | |
| 6,715,023 B1 | 3/2004 | Abu-Lebdeh et al. | |
| 6,721,813 B2 | 4/2004 | Owen et al. | |
| 6,732,210 B1 | 5/2004 | Mathieson | |
| 6,847,365 B1 | 1/2005 | Miller et al. | |
| 7,290,080 B2 * | 10/2007 | Patel | 711/100 |
| 7,332,929 B1 | 2/2008 | Normoyle et al. | |
| 7,380,092 B2 | 5/2008 | Perego et al. | |
| 7,487,327 B1 | 2/2009 | Chang et al. | |
| 7,624,222 B2 | 11/2009 | Nanda et al. | |
| 7,752,413 B2 | 7/2010 | Hoover et al. | |
| 8,082,381 B2 | 12/2011 | Reddy et al. | |
| 8,103,803 B2 | 1/2012 | Reddy et al. | |
| 2002/0156943 A1 | 10/2002 | Ishimura et al. | |
| 2003/0013477 A1 * | 1/2003 | McAlinden | 455/550 |
| 2003/0131164 A1 | 7/2003 | Abramson et al. | |
| 2006/0059289 A1 | 3/2006 | Ng et al. | |
| 2008/0244156 A1 * | 10/2008 | Patel | 711/100 |
| 2008/0245878 A1 * | 10/2008 | Shiota et al. | 235/492 |
| 2008/0282102 A1 | 11/2008 | Reddy et al. | |
| 2008/0288550 A1 * | 11/2008 | Wang et al. | 707/200 |
| 2010/0057974 A1 | 3/2010 | Reddy et al. | |
| 2010/0153618 A1 | 6/2010 | Mathieson et al. | |

OTHER PUBLICATIONS

Bluethgen, Hans-Martin; "BEE Mux-Demux Implementation for Connecting Subsystems on 2 FPGAs"; Jul. 15, 2002.
Micro Computer Control; "IP-201 I2C Bus Multiplexer Board, User's Guide, Revision 1"; Jun. 2000.

(Continued)

*Primary Examiner* — Hiep Nguyen

(57) ABSTRACT

Memory access techniques, in accordance with embodiments of the present technology, redirect memory access requests received from a baseband processor to shared memory coupled to an application processor. The techniques enable substantially real time read and write accesses by the application and baseband processors to the shared memory coupled to the application processor.

20 Claims, 9 Drawing Sheets

(56) References Cited

OTHER PUBLICATIONS

Stok, L.; "Interconnect Optimisation During Data Path Allocation"; IEEE 1990.
Erdahl, Mike; "An Open Architecture for Multiplexing and Processing Telemetry Data"; Veda Systems Incorporated; Jul. 15, 1997.
Digital Equipment Corporation; "DH11 asynchronous 16-line multiplexer maintenance manual"; Apr. 1975.
Campbell Scientific, Inc.; "AM16/32B Relay Multiplexer, Instruction Manual"; Oct. 2009.
Jiang et al.; "A Multiplexer Controlled by Fuzzy Associate Memory Leaky Bucket in ATM Networks"; 1997 IEEE International Symposium on Circuits and Systems; IEEE, Jun. 12, 1997.
Notice of Allowance Date Mailed Jun. 2, 2010; U.S. Appl. No. 12/202,444.
Non-Final Office Action Date Mailed Sep. 16, 2010; U.S. Appl. No. 12/202,444.
Notice of Allowance Date Mailed Jan. 27, 2011; U.S. Appl. No. 12/202,444.
Non-Final Office Action Date Mailed Sep. 29, 2010; U.S. Appl. No. 12/275,217.
Interview Summary Date Mailed Sep. 30, 2010; U.S. Appl. No. 12/275,217.
Notice of Allowance Date Mailed Jan. 21, 2011; U.S. Appl. No. 12/275,217.
XILINX; "Using Dedicated Multiplexers in Spartan-3 Generation FPGAs"; Application Note; May 20, 2005.
Notice of Allowance Date Mailed Apr. 27, 2011; U.S. Appl. No. 12/202,444.
Notice of Allowance Date Mailed Aug. 9, 2011; U.S. Appl. No. 12/202,444.
Notice of Allowance Date Mailed Jun. 9, 2011; U.S. Appl. No. 12/275,217.
Notice of Allowance Date Mailed Sep. 16, 2011; U.S. Appl. No. 12/275,217.

* cited by examiner

SHARED MEMORY ACCESS TECHNIQUES

BACKGROUND OF THE INVENTION

FIG. 1 shows a common conventional computing device. The computing device includes an application processor 105 and a baseband processor 110. The baseband processor 110 is communicatively coupled to the application processor 105 by one or more communication links 115. The baseband processor 110 is communicatively coupled to a transceiver 120 for communicating across a network. In other implementations, the transceiver is integral to the baseband processor. The application processor 105 is coupled to one or more input/output interfaces 125 such as a display screen, touch screen, keypad, communication ports and the like.

The application processor 105 executes computing device executable instructions that provide one or more user applications. The application processor 105 may also execute computing device executable instructions that provide an operating system. The baseband processor 110 executes computing device executable instructions that provide for voice and/or data communication over a network.

Each processor has its own memory for storing its respective computing device executable instructions and associated data. Typically the application processor 105 has its own non-volatile memory 130 and volatile memory 135. Likewise, the baseband processor 110 has its own non-volatile memory 140 and volatile memory 145. Accordingly, each processor has direct real time access to its own private memory.

SUMMARY OF THE INVENTION

Embodiments of the present technology are directed toward techniques for indirectly accessing shared memory. In one embodiment, a computing device includes an application processor and a baseband processor. A memory unit is communicatively coupled to the application processor. The baseband processor indirectly accesses the memory unit through the application processor.

In another embodiment, a method of accessing memory includes transmitting a read request from the baseband processor to the application processor. The application processor reads information from memory in response to the read request. The application processor then sends the information for the read request to the baseband processor.

In another embodiment, a method of accessing memory includes transmitting a write request from the baseband processor to the application processor. The information of the write request is buffered in a write buffer of the application processor. After buffering, the information may then be written to the memory by the application processor.

In yet another embodiment, a method of accessing memory includes transmitting a request to access information in non-volatile memory from the baseband processor to the application processor. The application processor reads the information from non-volatile memory and writes it to volatile memory. The application processor then sends an indication to the baseband processor that the information is available in volatile memory. Thereafter, a request to read a portion of the information in the volatile memory may be transmitted from the baseband processor to the application processor. The application processor reads the requested the portion of information from the volatile memory and sends it to the baseband processor.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 1:
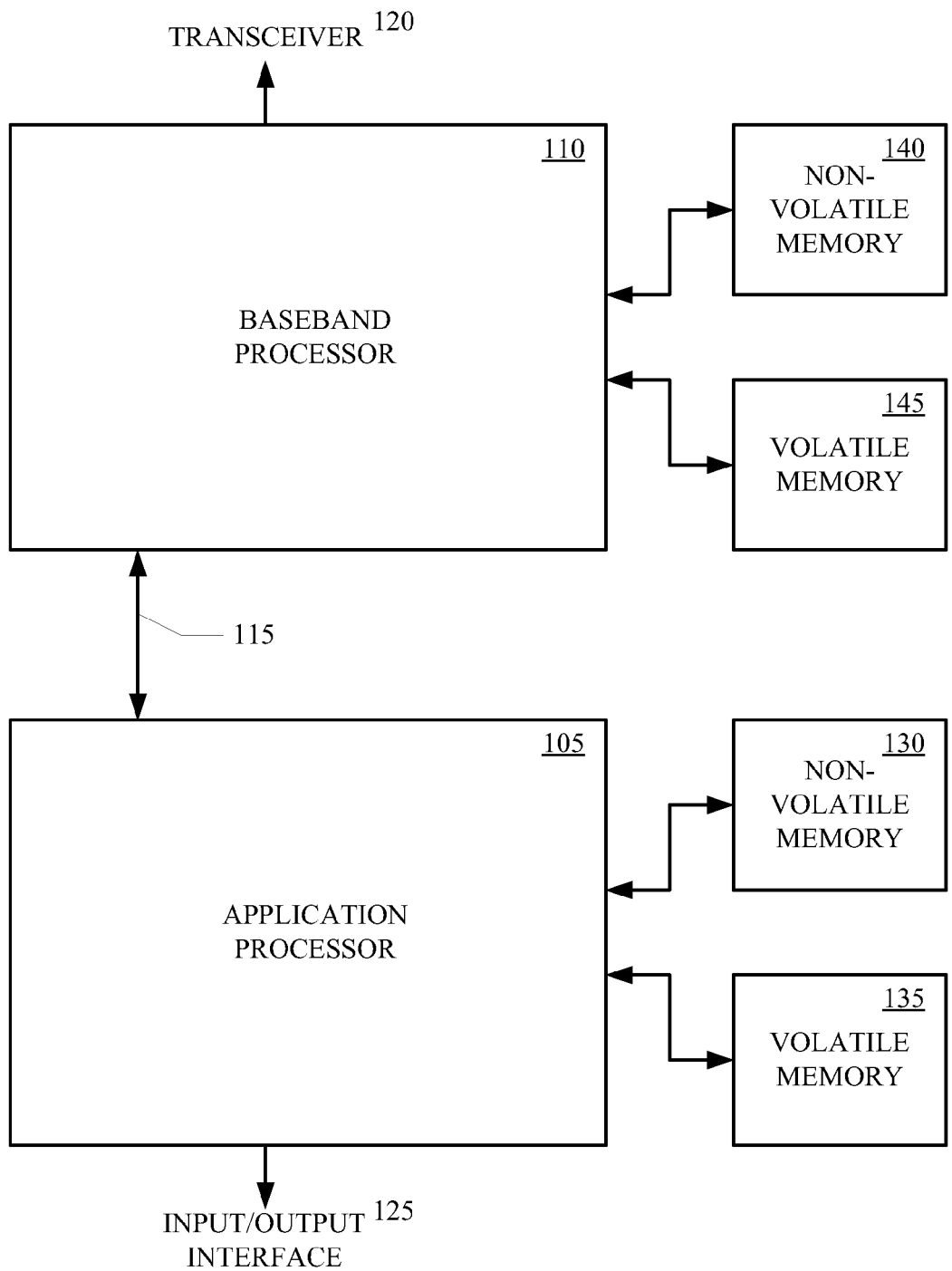
FIG. 1 shows a block diagram of a computing device according to the conventional art.
Figure 2:
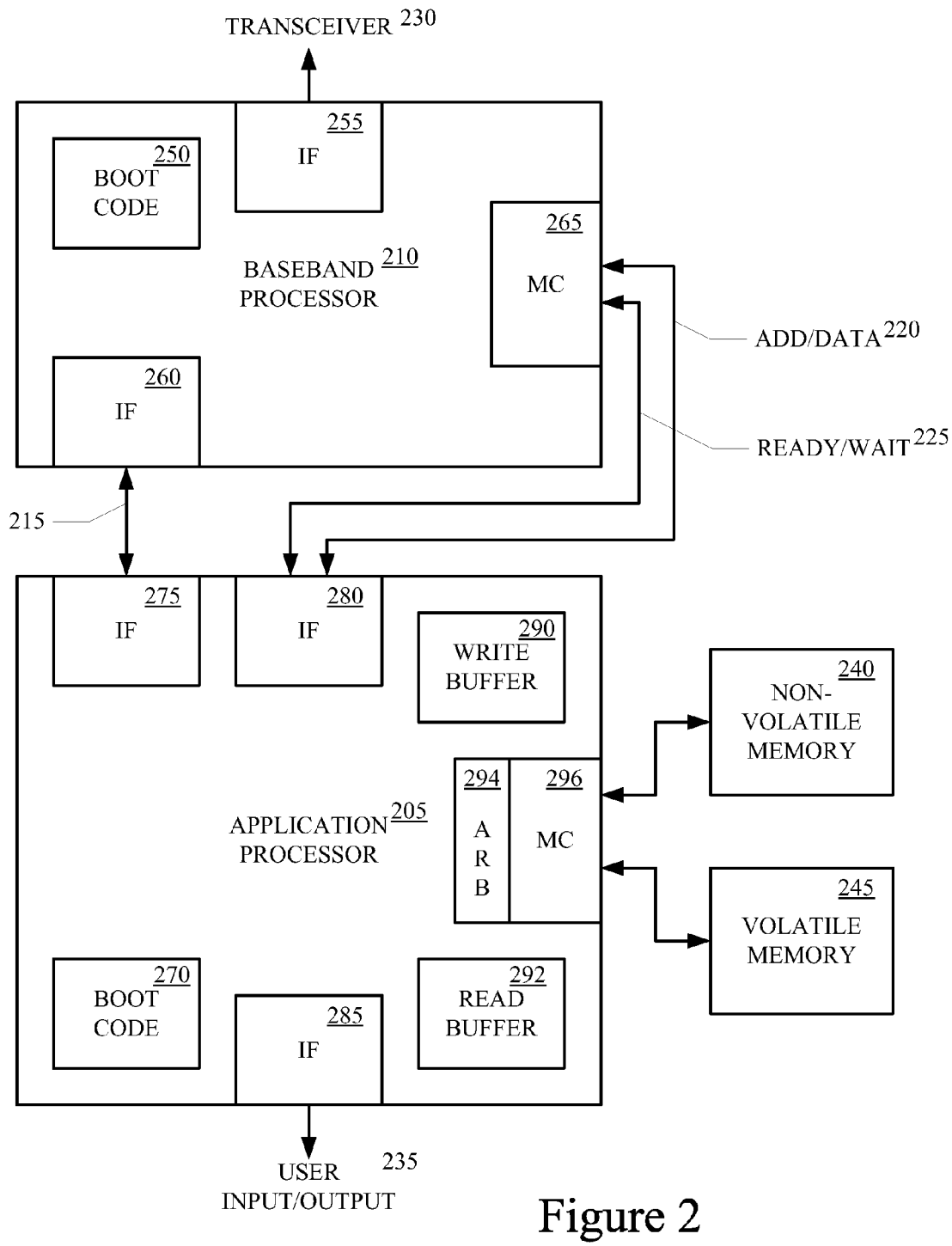
FIG. 2 shows a block diagram of a computing device, in accordance with one embodiment of the present technology.

FIG. 2 a computing device, in accordance with one embodiment of the present technology, is shown. The computing device may be a laptop computer, tablet PC, ultraportable notebook, pocket PC, ultramobile PC, netbook, smart phone, personal digital assistant (PDA), cell phone and/or the like. The computing device includes an application processor 205 communicatively coupled to a baseband processor 210 by one or more communication links 215-225. The baseband processor 210 is communicatively coupled to a transceiver 230 for communicating across a network. The application processor 205 is coupled to one or more input/output interfaces 235, such as a display screen, touch screen, keypad, communication ports and the like.

The computing device also includes a memory unit communicatively coupled to the application processor. In one implementation, one or more non-volatile memory units 240 and one or more volatile memory units 245 are communicatively coupled to the application processor. The application processor 205 provides a memory interface to the baseband processor and redirects the memory access requests received from the baseband processor 210 to its own memory 240, 245.

The baseband processor 210 typically includes an on-chip memory 250 for storing an initial portion of boot code, one or more communication interfaces 255, 260, and a memory controller 265 in addition to its processor core. The application processor 205 includes on-chip memory 270 for storing an initial portion of boot code, one or more communication interfaces 275-285, and a memory subsystem. The memory subsystem includes a write buffer 290, a read buffer 292, memory arbiter 294, and a memory controller 296.

The non-volatile memory 240 is computing device readable media that provides for non-volatile storage of computing device executable code (e.g., instructions) and data, herein collectively referred to as information. The non-volatile memory 240 may be read-only memory (ROM), flash memory, magnetic memory (e.g., hard disk drive), optical memory, and/or the like. A first non-volatile memory typically stores a second portion of the boot code for setup and configuration of the processors. For example, the non-volatile memory may store a first set of code and data for setting up and configuring the baseband processor and a second set of code and data for setting up and configuring the application processor. The non-volatile memory 240 may also store an operating system, one or more applications, data and/or the like. Alternatively, a second non-volatile memory may store the operating system, applications, data and/or the like. The volatile memory 245 is computing device readable media that provides for volatile storage of computing device executable instructions and data. The volatile memory 245 may be random access memory (RAM, DRAM, SRAM) or the like. The operating system, applications and the like are typically loaded from one or more non-volatile memory units 240 into one or more volatile memory units 245, from where the application processor and/or baseband processor execute them. For example, the volatile memory 245 may store the communication software for execution by the baseband processor 210. The communication software provides for transmitting and receiving voice and/or data over one or more networks (e.g., a cellular telephone network). The volatile memory 245 may also store the operating system, applications, and user interface for execution by the application processor 205.

The baseband processor in the conventional art had direct real time access to its own private memory. In the present embodiments, the baseband processor 210 now indirectly accesses shared memory, where its own fetches have to contend with memory access requirements of the application processor 205. Therefore, the memory subsystem of the application processor 205 acts as a slave memory controller to the memory controller 265 of the baseband processor 210. The memory arbiter 294 is adapted to minimize latency from the memory subsystem of the application processor 205 to the baseband processor 210. The write buffer 290 allows write transfers from the baseband processor 210 to be buffered within the application processor 205 until they can be written to memory 240, 245. The write buffer 290, therefore, allows the baseband processor 210 to have a real time response to writes unless the write buffer 290 is full. The read buffer 292 along with a prefetch algorithm is used to predict reads and buffer the prefetched read results. Prefetching enables a significant percentage of read requests from the baseband processor 210 to be responded to in real time, even when the application processor 205 is accessing the memory 240, 245 at substantially the same time. Therefore, the baseband processor 210 will still get sufficient bandwidth from the slave memory interface to service its real-time processing needs. In one implementation, a 'ready/wait' signal from the application processor 205 to the baseband processor 210 can be used to indicate that the baseband processor 210 should pause its current memory access activity because either the read data is not ready (e.g., prefetched) or the write buffer 290 is full. The memory subsystem may enforce write/read ordering. Therefore, the memory subsystem protects the integrity of data. The memory subsystem may also provide for snooping the write buffer to satisfy a read request.

The memory subsystem of the application processor 205 can provide two different methods to access non-volatile memory 240 by the baseband processor 210. In one implementation, the application processor 210 provides a slave memory interface to its non-volatile memory 240 and sends code and data to the baseband processor 210 over a suitable serial or parallel communication link 220. The interface may be a SPI serial link, where the application processor mimics the behavior of an SPI serial flash memory device. Other suitable links may include and HSI, USB, or the like. In another implementation, the application processor directly loads baseband processor code and data from the non-volatile memory 240 into the volatile memory 245. The application processor 205 then allows the baseband processor 210 to access the code and data from the volatile memory device 245.

The memory subsystem also provides for repartitioning of the memory on a use case basis. For example, if the baseband processor 210 is off or in a mode that consumes a smaller memory footprint the application processor 205 can allocate more volatile memory 245 to the application space and less to the baseband space.

Figure 3:
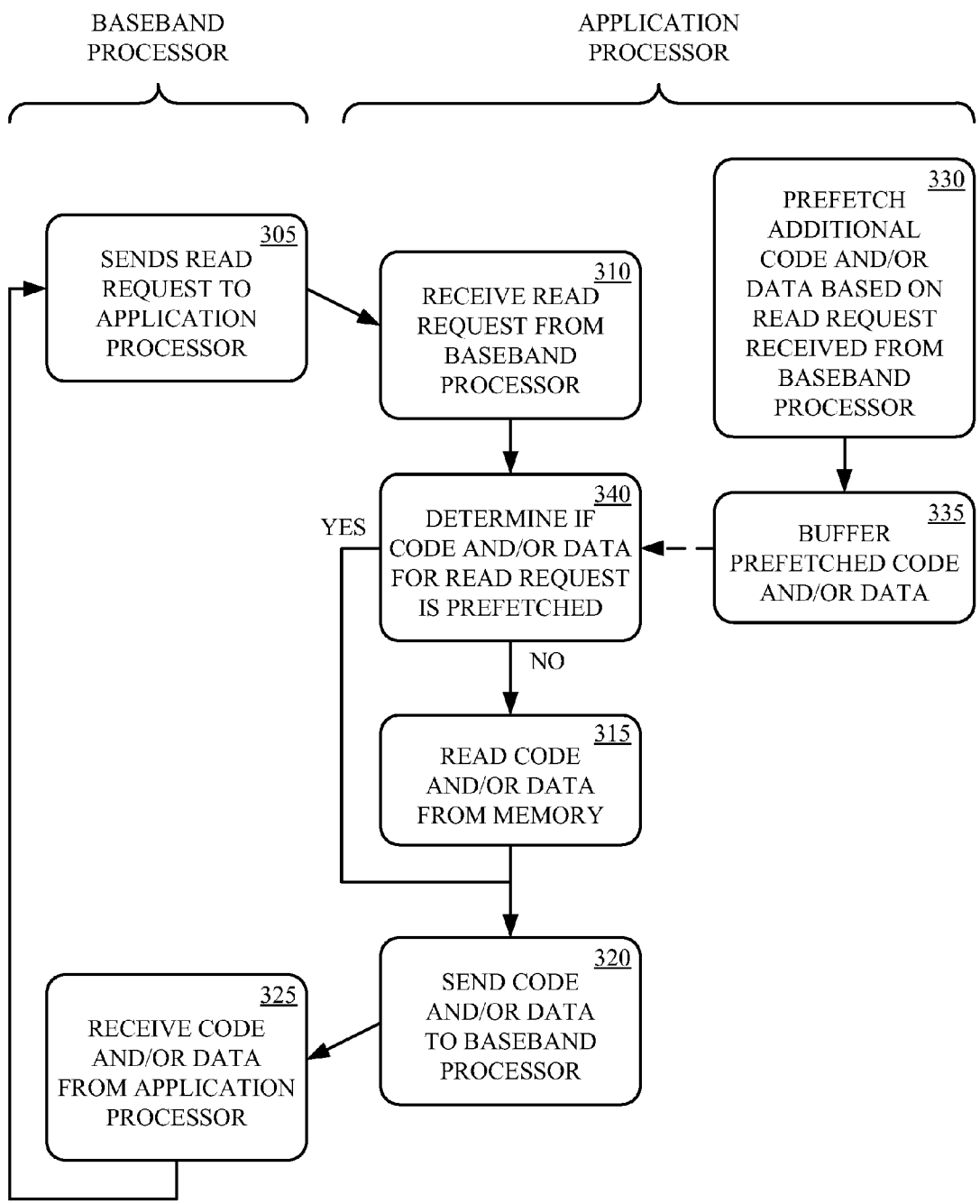
FIG. 3 shows a flow diagram of a method of accessing memory, in accordance with one embodiment of the present technology.

Referring now to FIG. 3, a method of accessing memory, in accordance with one embodiment of the present technology, is shown. At 305, the baseband processor sends a request to read information from memory coupled to the application processor. The information may include code and/or data. At 310, the request to read information from memory is received by the application processor. At 315, the application processor reads the requested information from memory. In one implementation, the memory controller of the application processor, under control of the arbiter, generates a set of control signals to read the requested code and/or data from the memory. At 320, the application processor sends the requested information to the baseband processor. At 325, the baseband processor receives the requested information from the application processor. It is appreciated that the baseband processor may send the read request and receive the information in response thereto substantially the same as it would read data from memory if it had its own private memory. In such instances, the process by which the application processor reads the information from its memory is transparent to the baseband processor. In other instances, the baseband processor or code executed thereon may be modified such that the baseband processor is effectively aware that the information is being read from memory coupled to the application processor.

The processes 305-325 may be repeated one or more additional times to read additional information from memory coupled to the application processor for the baseband processor. Furthermore, the application processor may prefetch the additional information, at 330. The prefetched information may be buffered in a read buffer of the application processor, at 335. If prefetching is employed, the application processor may check the read buffer before accessing the memory to see if the requested information has been prefetched and buffered in the read buffer, at 340. If the requested information has been prefetched, the application processor may skip process 315 and may instead send the requested information from the read buffer to the application processor, at 320.

In one implementation, a first portion of baseband processor boot code is executed by the baseband processor to initiate configuration and setup of the baseband processor. The execution of the first portion of the baseband processor boot code also causes the baseband processor to make a request for a second portion of the boot code stored in non-volatile memory coupled to the application processor. The second portion of the baseband processor boot code is executed by the baseband processor to complete configuration and setup of the baseband processor. Typically, the second portion of the boot code is requested in a plurality of requests, each for a specified amount (e.g. a page) of boot code. Therefore, the application processor prefetchs one or more pages of boot code, buffers it, and then sends it to the baseband processor in response to corresponding subsequent requests. Typically, this type of access to the non-volatile memory will be made across a memory access type communication interface between the memory controller of the baseband processor and the memory subsystem of the application processor. However, the memory accesses may also be made across a general communication interface, such as a UART interface between the baseband processor and the application processor.

In another implementation, the baseband processor requests code and/or data, such as communication software that provides for transmitting and receiving both voice and data over a network (e.g., cellular telephone network). The code and/or data is stored in volatile memory coupled to the application processors. Typically, the communication software is accessed in pages of code and/or data. Therefore, the application processor may prefetch one or more pages of applicable code and/or data based on the previous requests. The prefetched code and/data is buffered and sent to the baseband processor in response to a corresponding request. Thereafter, the communication software is executed by the baseband processor to provide for transmitting and receiving both voice and data over the network.

At any time during processes 305-340 the application processor may also access memory. In one implementation, a first portion of application processor boot code is executed by the application processor to initiate configuration and setup of the application processor. The execution of the first portion of the application processor boot code also causes the application processor to make a request for a second portion of the boot code stored in non-volatile memory coupled to the application processor. The second portion of the application processor boot code is executed by the application processor to complete configuration and setup of the application processor. The arbiter controls servicing of the plurality of memory accesses so that both processors can access the non-volatile memory in substantially real time to retrieve their respective boot code.

Figure 4A:
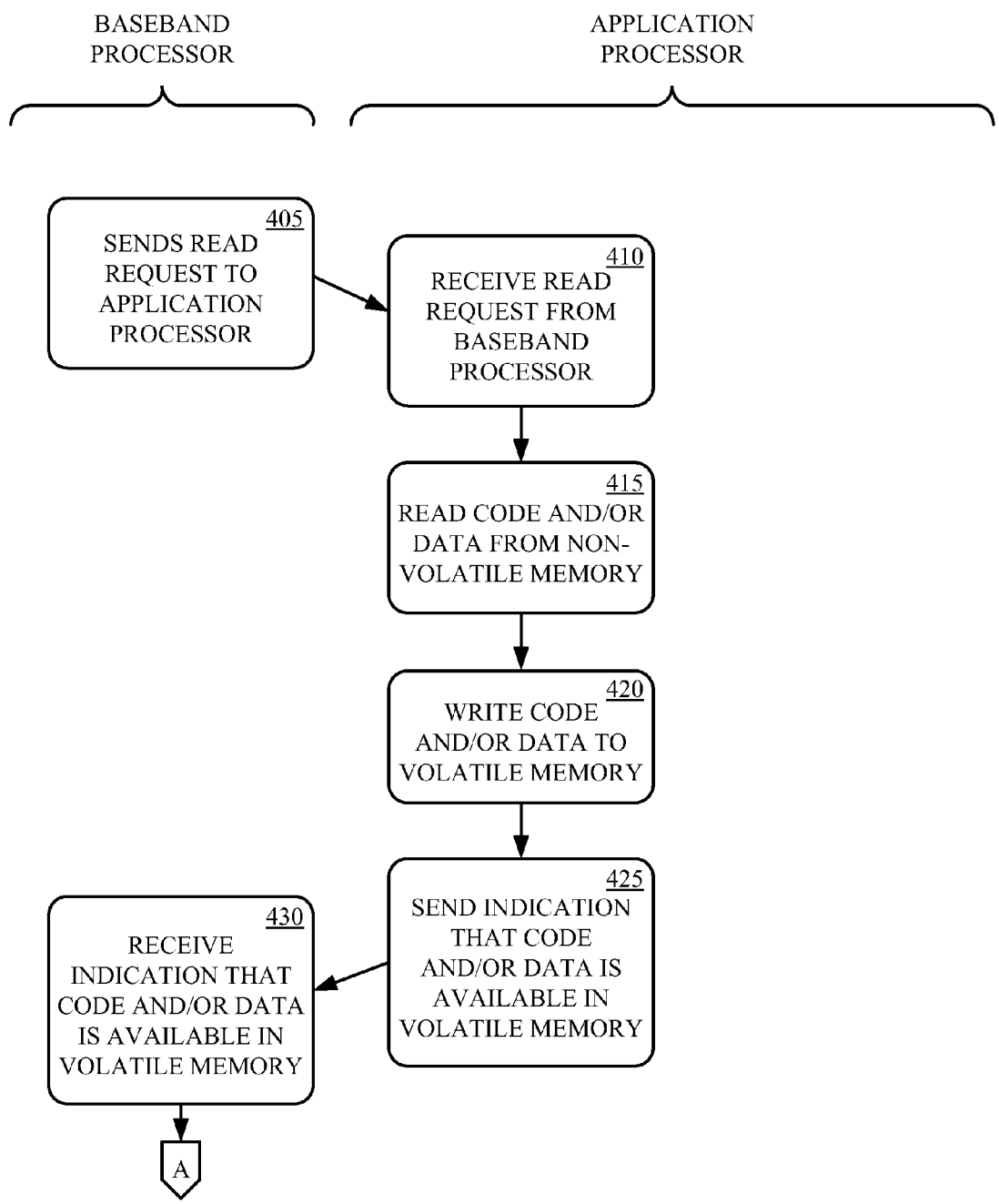
FIGS. 4A and 4B show a flow diagram of a method of accessing memory, in accordance with another embodiment of the present technology.
Figure 4B:
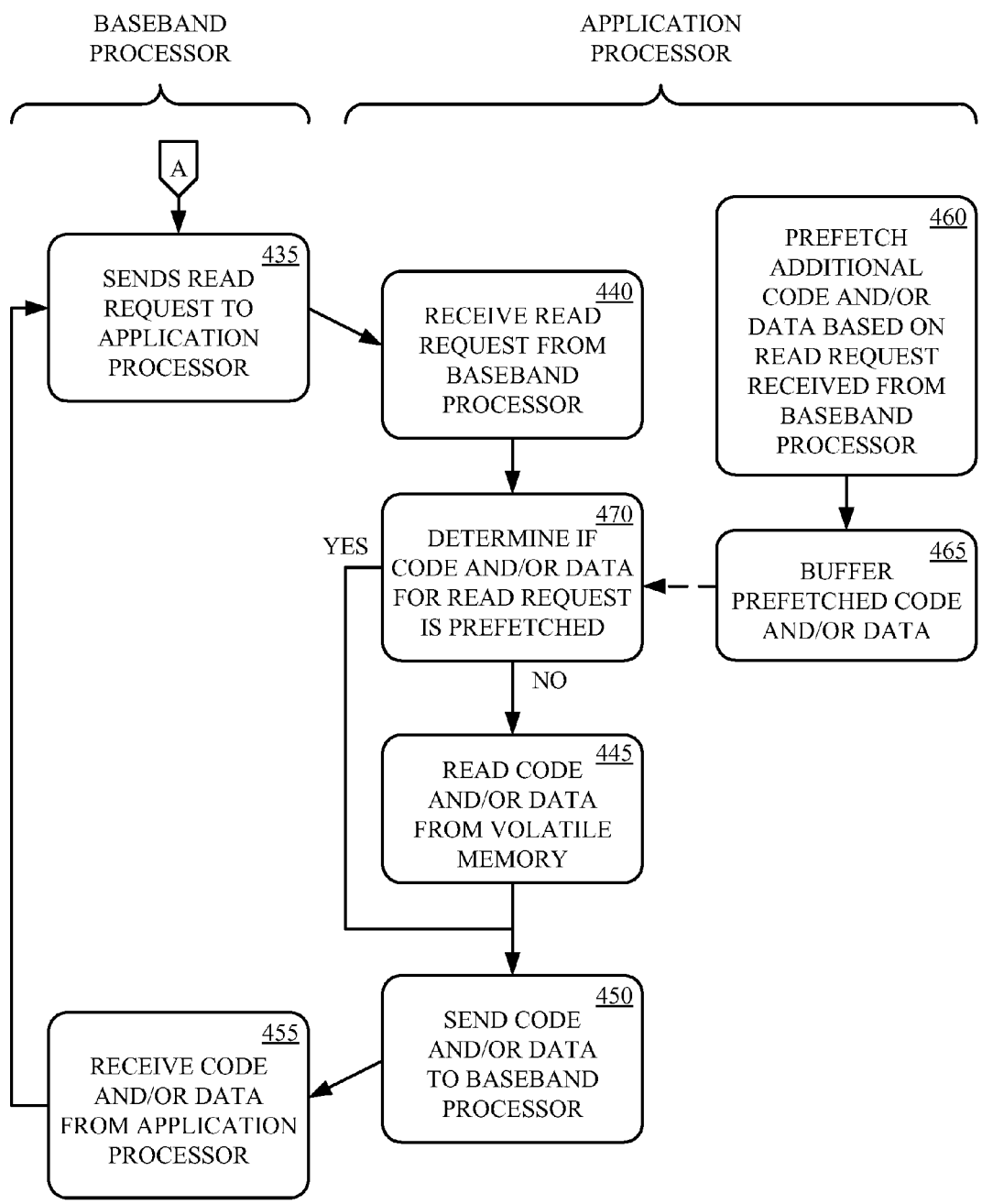

Referring now to FIGS. 4A and 4B, a method of accessing memory, in accordance with another embodiment of the present technology, is shown. At 405, the baseband processor sends a request, to the application processor, to access information in non-volatile memory. The information may be code and/or data. At 410, the request to access information in non-volatile memory is received by the application processor. At 415, the application processor reads the requested information from the non-volatile memory. At 420, the application processor writes the requested information to volatile memory. At 425, the application processor sends a response to the baseband processor indicating that the requested information is available in volatile memory. At 430, the baseband processor receives the indication that the requested information is available in volatile memory.

At 435, the baseband processor sends a read request to the application processor to access a portion of the information available in the volatile memory. At 440, the request to read the portion of the information stored in the volatile memory is received by the application processor. At 445, the application processor reads the requested portion of the information from the volatile memory. At 450, the application processor sends the requested portion of the information to the baseband processor. At 455, the baseband processor receives the requested portion of the information from the application processor.

The processes 435-455 may be repeated one or more additional times to read additional portions of the information from volatile memory for the baseband processor. Furthermore, the application processor may prefetch the additional portions of the information, at 460. The prefetched information may be buffered in the application processor, at 465. If prefetching is employed, the application processor may check the read buffer before accessing the volatile memory to see if the requested portion of the information has been prefetched and buffered in the read buffer, at 470. If the requested portion of the information has been prefetched, the application processor may skip process 445 and may instead send the requested portion of information from the read buffer to the application processor, at 450.

In one implementation, a first portion of baseband processor boot code is executed by the baseband processor to initiate configuration and setup of the baseband processor. The execution of the first portion of the baseband processor boot code also causes the baseband processor to make a request for a second portion of the boot code stored in non-volatile memory coupled to the application processor. Typically, the request for the second portion of the boot code is made across a general communication interface, such as a UART interface, setup and configured by the first portion of the baseband processor boot code. The second portion of the boot code is read from the non-volatile memory and written into the volatile memory by the application processor. Thereafter, the baseband processor may request predetermined amounts of the second portion of the boot code stored in the volatile memory. The second portion of the baseband processor boot code received in predetermined amounts from the application processor may then be executed by the baseband processor to complete configuration and setup of the baseband processor. Typically, the request of the second portion of the baseband processor boot code from the volatile memory will be made across a memory access type communication interface between the memory controller of the baseband processor and the memory subsystem of the application processor.

In another implementation, the baseband processor requests code and/or data, such as communication software that provides for transmitting and receiving voice and/or data over a network (e.g., cellular telephone network), stored in volatile memory coupled to the application processors. The communication software is read from the non-volatile memory and written into the volatile memory by the application processor. Thereafter, the baseband processor may request code and/or data of the communication software stored in the volatile memory. The code and/or data of the communication software is executed by the baseband processor, upon receipt from the application processor, to provide for transmitting and receiving voice and/or data over the network.

At any time during processes 405-470, the application processor may also access memory. For example, the application processor may also access memory to read its boot code in, or read its operating system and/or applications in, and/or read or write associated data, substantially at the same time as the baseband processor is reading or writing to memory. The arbiter and prefetch algorithm in combination with the write and read buffers enables memory access by both the application processor and baseband processor with little or no additional latency as compared to conventional techniques.

Figure 5:
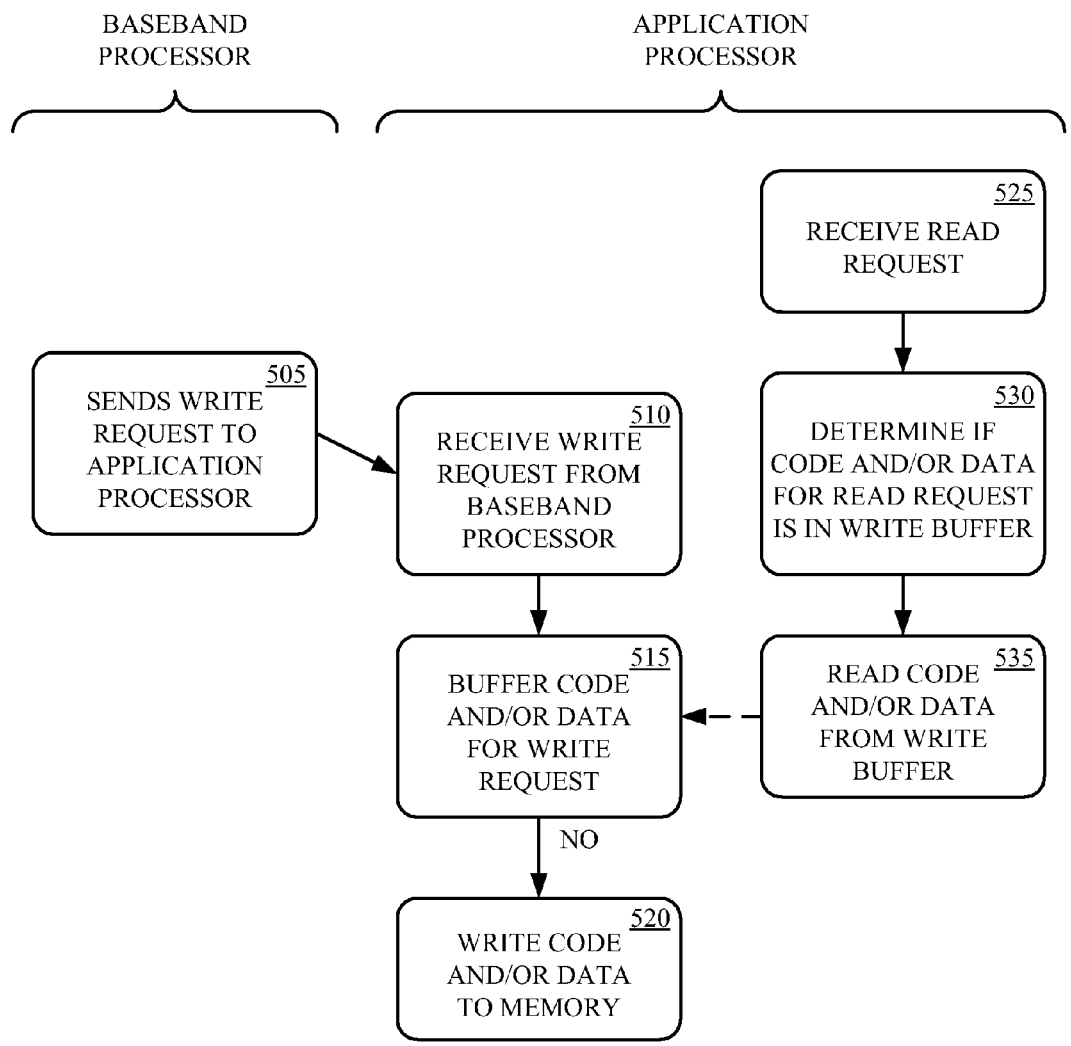
FIG. 5 shows a flow diagram of a method of accessing memory, in accordance with yet another embodiment of the present technology.

Referring now to FIG. 5, a method of accessing memory, in accordance with yet another embodiment of the present technology, is shown. At 505, the baseband processor sends information to the application processor for writing to memory. The information may be code and/or data. At 510, the application processor receives the information for writing to memory. At 515, the information is buffered in the write buffer. At 520, the application processor writes the information to memory.

At any time during processes 505-520, the application processor may also receive a request to read the information, in accordance with the read processes described above with regard to FIG. 3 or FIGS. 4A and 4B, at 525. If a read request is received, the application processor determines if the information for the request is in the write buffer, at 530. If the information for the read request is in the write buffer, the application processor reads the requested information from the write buffer, at 535. Otherwise, the information is read from memory as described above with regard to FIG. 3 or FIGS. 4A and 4B.

Figure 6:
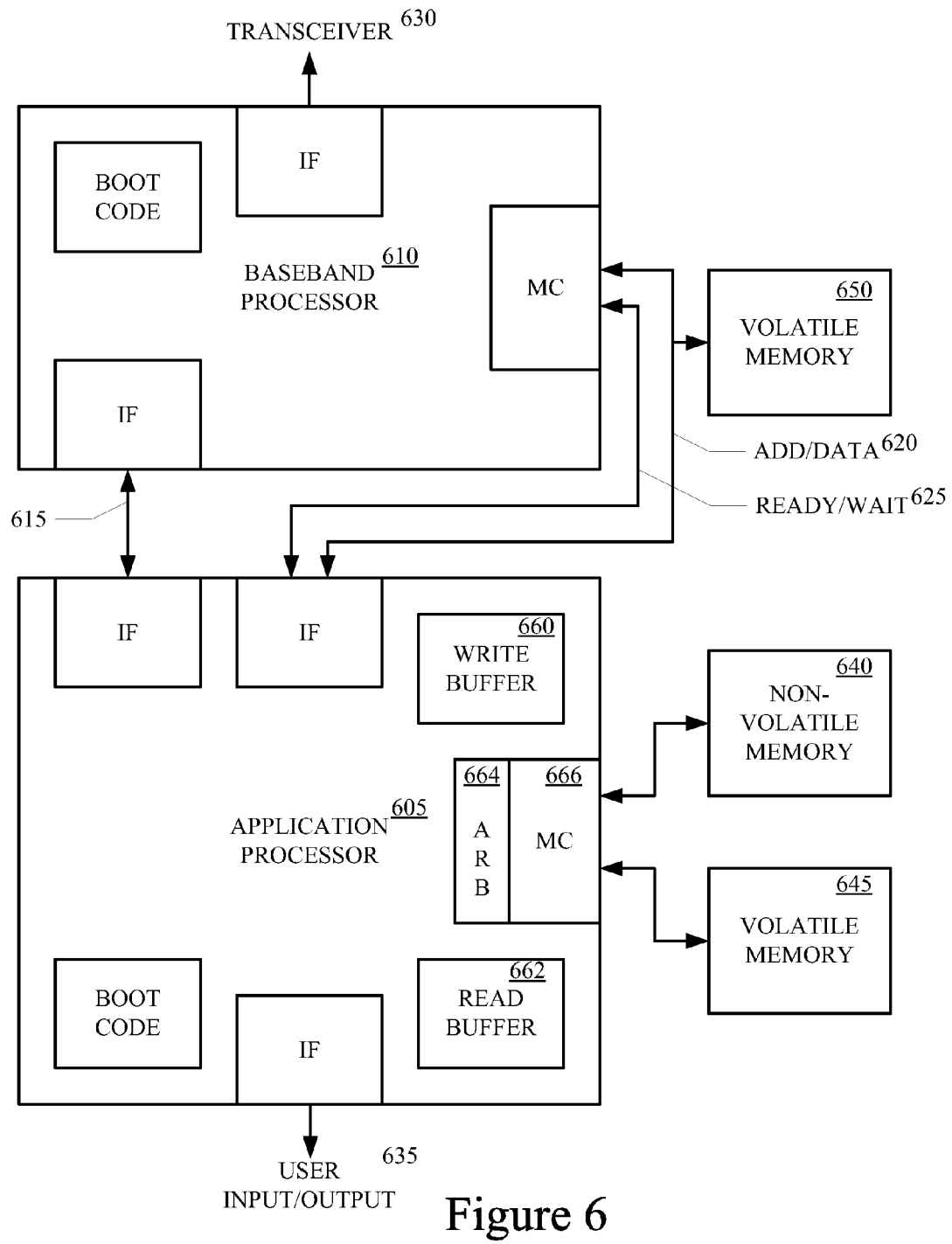
FIG. 6 shows a block diagram of a computing device, in accordance with another embodiment of the present technology.

Referring now to FIG. 6 a computing device, in accordance with another embodiment of the present technology, is shown. The computing device includes an application processor 605 communicatively coupled to a baseband processor 610 by one or more communication links 615-625. The baseband processor 610 is communicatively coupled to a transceiver 630 for communicating across a network. The application processor 605 is coupled to one or more input/output interfaces 635, such as a display screen, touch screen, keypad, communication ports and the like.

The computing device also includes one or more non-volatile memory units 640 and one or more volatile memory units 645 communicatively coupled to the application processor 605. The application processor 605 provides a memory interface to the baseband processor 610 and redirects memory access requests to non-volatile memory received from the baseband processor 610 to its own non-volatile memory 640.

In the present embodiments, the baseband processor 605 now indirectly accesses shared non-volatile memory 640, where its own fetches have to contend with memory access requirements of the application processor 610. The memory subsystem of the application processor 610 includes a write buffer 660, a read buffer 662, memory arbiter 664, and a memory controller 666. The write buffer 660 allows write transfers from the baseband processor 610 to be buffered within the application processor 605 until they can be written to non-volatile memory 640. The write buffer 660, therefore, allows the baseband processor 610 to have a real time response to writes unless the write buffer 660 is full. The read buffer 662 along with a prefetch algorithm is used to predict reads to non-volatile memory 640 and buffer the prefetched read results. Prefetching enables a significant percentage of read requests from the baseband processor 610 to be responded to in real time, even when the application processor 605 is accessing memory at substantially the same time. In one implementation a 'ready/wait' signal from the application processor 605 to the baseband processor 610 can be used to indicate that the baseband processor 610 should pause its current memory access activity because either the read data is not ready (e.g., prefetched) or the write buffer 660 is full. The memory subsystem may enforce write/read ordering. Therefore, the memory subsystem protects the integrity of data. The memory subsystem may also provide for snooping the write buffer to satisfy a read request.

In one implementation, the application processor 605 directly loads baseband processor code and data from its non-volatile memory 640 into the volatile memory 650 coupled to the baseband processor 610. The baseband processor 610 then accesses the code and data from its own volatile memory device 650.

Figure 7A:
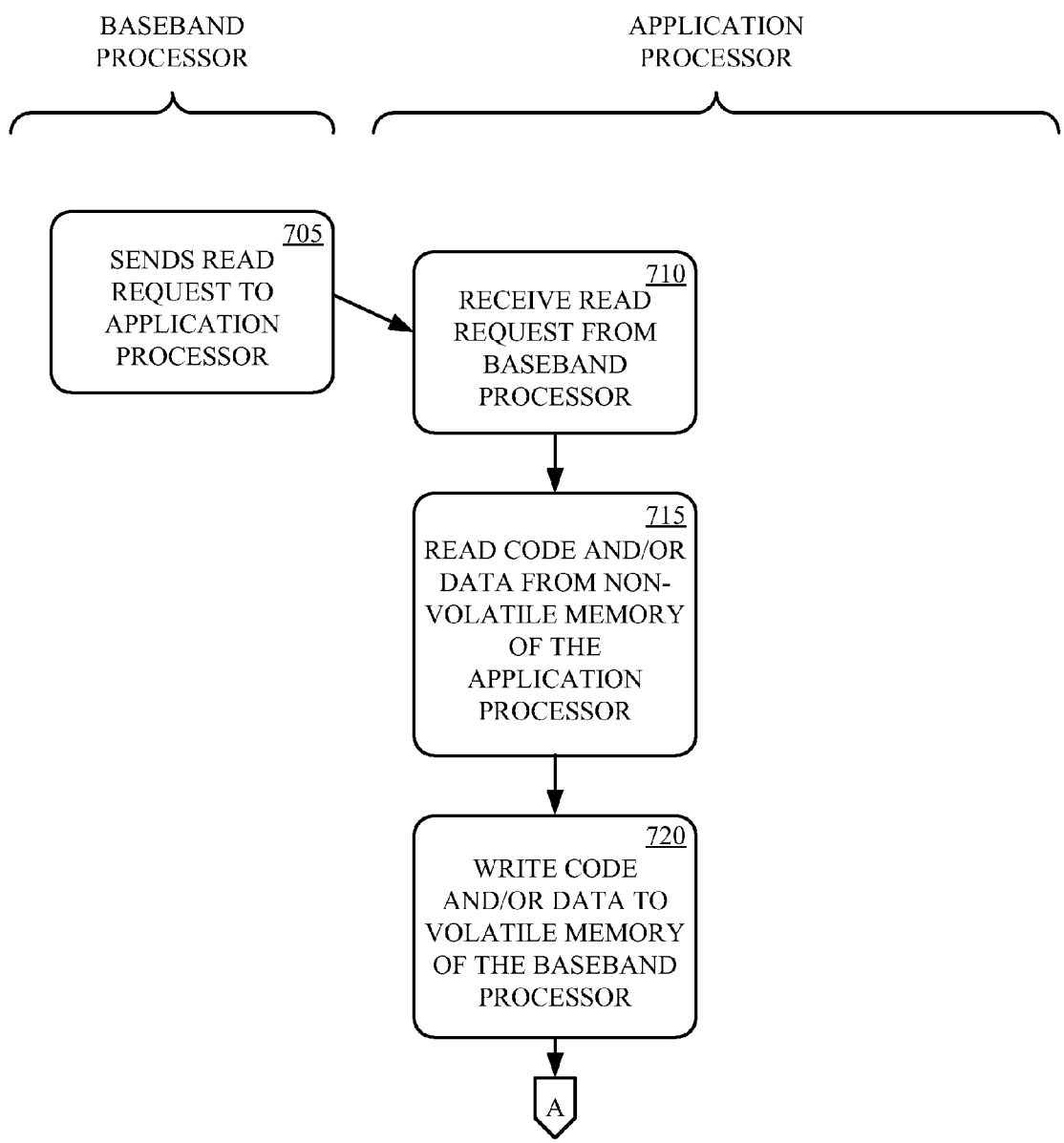
FIGS. 7A and 7B show a flow diagram of a method of accessing memory, in accordance with yet another embodiment of the present technology.
Figure 7B:
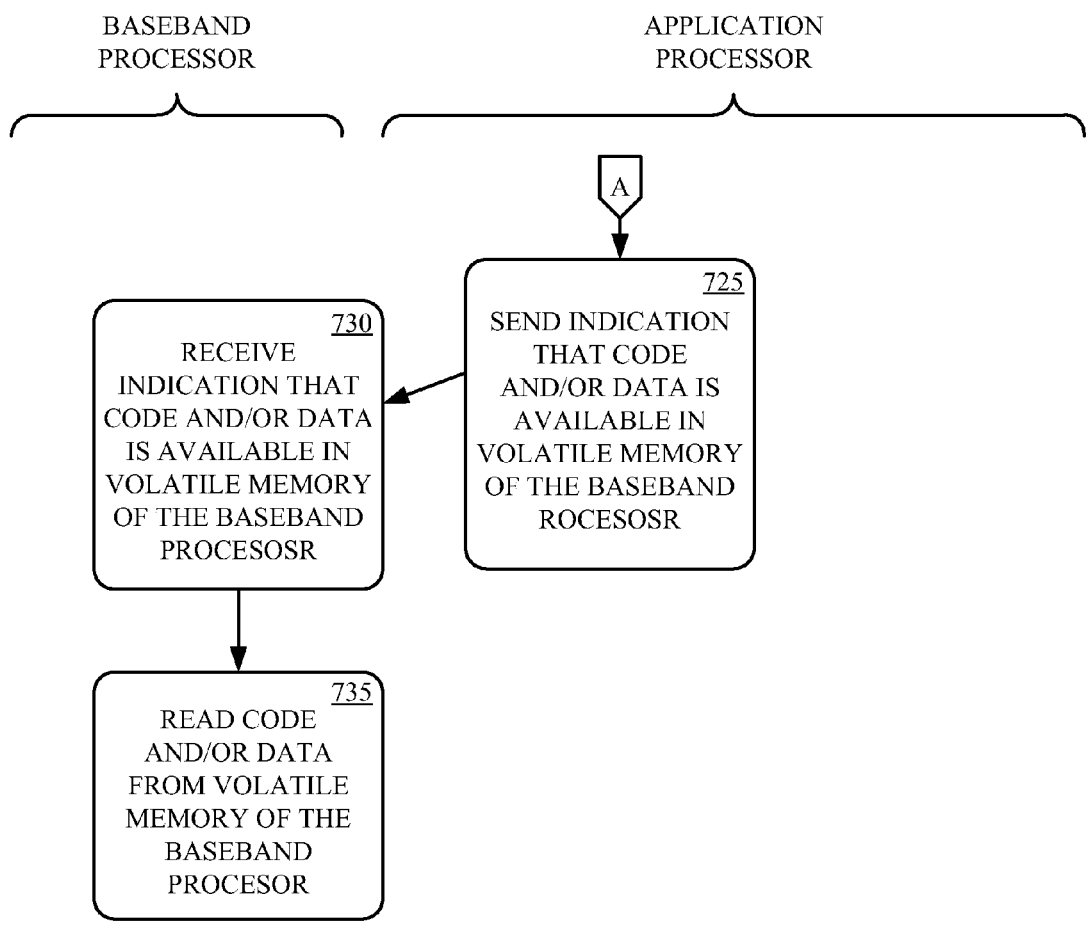

Referring now to FIGS. 7A and 7B, a method of accessing memory, in accordance with another embodiment of the present technology, is shown. At 705, the baseband processor sends a request to the application processor to access information in non-volatile memory coupled to the application processor. The information may be code and/or data. At 710, the request to access information in non-volatile memory is received by the application processor. At 715, the application processor reads the requested information from the non-volatile memory. At 720, the application processor writes the requested information to volatile memory coupled to the baseband processor. At 725, the application processor sends a response to the baseband processor indicating that the requested information is available in volatile memory coupled to the baseband processor. At 730, the baseband processor receives the indication that the requested information is available in volatile memory coupled to the baseband processor. At 735, the baseband processor reads the information from the volatile memory coupled to the baseband processor.

In one implementation, a first portion of baseband processor boot code is executed by the baseband processor to initiate configuration and setup of the baseband processor. The execution of the first portion of the baseband processor boot code also causes the baseband processor to make a request for a second portion of the boot code stored in non-volatile memory coupled to the application processor. Typically, the request for the second portion of the boot code is made across a general communication interface, such as a UART interface, setup and configured by the first portion of the baseband processor boot code. The second portion of the boot code is read from the non-volatile memory coupled to the application processor and written into the volatile memory coupled to the baseband processor by the application processor. Typically, the writing of the second portion of the baseband processor boot code to the volatile memory coupled to the baseband processor will be made across a memory access type communication interface between the memory subsystem of the application processor and the volatile memory coupled to the baseband processor. Thereafter, the baseband processor may read predetermined amounts of the second portion of the boot code stored in the volatile memory coupled to the baseband processor. The second portion of the baseband processor boot code read in predetermined amounts may then be executed by the baseband processor to complete configuration and setup of the baseband processor.

At any time during processes 705-735 the application processor may also access memory. In one implementation, a first portion of application processor boot code is executed by the application processor to initiate configuration and setup of the application processor. The execution of the first portion of the application processor boot code also causes the application processor to make a request for a second portion of the boot code stored in non-volatile memory coupled to the application processor. The second portion of the application processor boot code is executed by the application processor to complete configuration and setup of the application processor. The arbiter controls servicing of the plurality of memory accesses so that both processors can access the non-volatile memory coupled to the application processor in substantially real time to retrieve their respective boot code.

Embodiments of the present technology reduce or eliminate the need for separate volatile and/or non-volatile memory for the baseband processor. Therefore, embodiments of the present technology advantageously reduce the cost of the system, the size of the system and/or power consumed by the system. The system also advantageously allows repartitioning of the memory on a use case basis.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. A system comprising:
    a non-volatile memory unit communicatively coupled to an application processor;
    a first volatile memory unit communicatively coupled to the application processor
    a baseband processor communicatively coupled to the application processor;
    a second volatile memory unit communicatively coupled to the baseband processor, wherein the baseband processor executes baseband processor code and data from the second volatile memory unit; and
    the application processor including a memory subsystem to load baseband processor code and data from the non-volatile memory unit into the second volatile memory unit, wherein the baseband processor indirectly accesses the non-volatile memory unit through the application processor.

2. The system of claim 1, wherein the memory subsystem of application processor includes a memory interface to redirect memory access requests received from the baseband processor to load baseband processor code and data from the non-volatile memory unit into the second volatile memory unit.

3. The system of claim 2, wherein the memory interface of the application processor includes an arbiter for controlling read and write accesses to the memory unit by the application processor and baseband processor.

4. The system of claim 3, wherein the memory interface of the application processor further includes a write buffer for buffering writes from the baseband processor to the memory unit.

5. The system of claim 3, wherein the memory interface of the application processor further includes a read buffer for prefetching reads from the memory unit by the baseband processor.

6. The system of claim 3 wherein the baseband processor executes the baseband processor code and data to transmit or receive voice or data over a network.

7. The system of claim 3, wherein the application processor executes application software stored in the memory unit.

8. A method comprising:
    receiving, by an application processor from a baseband processor, a read request for information;
    reading, by the application processor, the information for the read request from a non-volatile memory unit communicatively coupled to the application processor;
    writing, by the application processor, the information from the non-volatile memory unit to a volatile memory unit communicatively coupled to the baseband processor; and
    sending, by the application processor, a response to the baseband processor indicating that the requested information is available in the volatile memory unit communicatively coupled to the baseband processor.

9. The method according to claim 8, further comprising:
    prefetching, by the application processor, additional information from the memory; and
    buffering the additional information in the application processor.

10. The method according to claim 9, further comprising:
    determining, by the application processor, if the information for the read request has been prefetched and buffered; and
    if the information for the read request has been prefetched and buffered, reading the information from the read buffer instead of reading the data from the non-volatile memory unit.

11. The method according to claim 8, further comprising:
    receiving, by the application processor, a write request from the baseband processor;
    buffering information of the write request in a write buffer of the application processor; and
    writing the information of the write request to the non-volatile memory unit by the application processor.

12. The method according to claim 11, further comprising:
    determining, by the application processor, if the information for the read request is in the write buffer; and
    if the information for the read request is in the write buffer, reading the information from the write buffer instead of the non-volatile memory unit.

13. The method according to claim 8, further comprising:
    reading or writing additional information from the non-volatile memory unit by the application processor at substantially the same time as reading or writing the information to the non-volatile memory unit by the baseband processor.

14. The method according to claim 8, further comprising:
    executing, by the baseband processor, a first portion of baseband processor boot code stored on chip with the baseband processor;
    receiving, by the application processor from a baseband processor across a general communication interface, a read request for a second portion of the baseband processor boot code;
    reading, by the application processor, the second portion of the baseband processor boot code for the read request from the non-volatile memory unit communicatively coupled to the application processor;
    writing, by the application processor, the second portion of the baseband processor boot code from the non-volatile memory unit to a volatile memory unit communicatively coupled to the baseband processor across a memory access type communication interface; and
    sending, by the application processor, a response to the baseband processor indicating that the second portion of the baseband processor boot code is available in the volatile memory unit communicatively coupled to the baseband processor.

15. The method according to claim 14, further comprising:
    reading, by the baseband processor after receiving the response, predetermined amounts of the second portion of the baseband processor boot code from the volatile memory unit communicatively coupled to the baseband processor; and executing, by the baseband processor, the predetermined amounts of the second portion of the baseband processor boot code.

16. The method according to claim 8, further comprising repartitioning the non-volatile memory unit based on a given use by the application processor and baseband processor.

17. A method comprising:

receiving, by an application processor from a baseband processor across a general communication interface, a request to access information in non-volatile memory communicatively coupled to the application processor;

reading, by the application processor, the information from the non-volatile memory communicatively coupled to the application processor;

writing, by the application processor, the information to a volatile memory communicatively coupled to the application processor;

sending an indication, from the application processor to the baseband processor, that the information is available in volatile memory communicatively coupled to the application processor;

receiving, by the application processor from the baseband processor in response to the indication, a request to read a portion of the information in the volatile memory communicatively coupled to the application processor;

reading, by the application processor, the portion of information from the volatile memory communicatively coupled to the application processor; and sending, from the application processor to the baseband process across a memory access type communication interface, the portion of the information for the read request to the baseband processor for execution.

18. The method according to claim 17, further comprising:

prefetching by the application processor an additional portion of the information from the volatile memory; and buffering the additional portion of the information in the application processor.

19. The method according to claim 18, further comprising:

receiving, from the baseband processor, an additional request to read another, portion of the information in the volatile memory determining if the portion of information for the additional read request has been prefetched and buffered; and if the portion of information for the additional read request has been prefetched and buffered, reading the portion of information for the additional read request from the read buffer instead of reading the portion of information for the additional read request from the volatile memory.

20. The method according to claim 19, further comprising:

reading or writing information from the volatile memory or non-volatile memory by the application processor at substantially the same time as reading or writing information to the volatile memory or non-volatile memory by the baseband processor.

* * * * *